United States Patent
Nold et al.

(10) Patent No.: US 10,296,128 B1
(45) Date of Patent: May 21, 2019

(54) MULTI-STATE PRESS AND HOLD USER INTERFACE

(71) Applicant: Google Inc., Mountain View, CA (US)

(72) Inventors: John Jordan Nold, Boulder, CO (US); Alberto Abelardo Vildosola, Boulder, CO (US); Joe Venters, Alameda, CA (US); Chikezie Ejiasi, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 206 days.

(21) Appl. No.: 14/845,396

(22) Filed: Sep. 4, 2015

(51) Int. Cl.
  *G06F 3/041* (2006.01)
  *G06F 3/0481* (2013.01)
  *G06F 3/01* (2006.01)

(52) U.S. Cl.
  CPC ............ *G06F 3/0416* (2013.01); *G06F 3/016* (2013.01); *G06F 3/04817* (2013.01)

(58) Field of Classification Search
  CPC ..... G06F 1/1669; G06F 1/1673; G06F 3/0416
  USPC .......................................................... 340/5.2
  See application file for complete search history.

(56) References Cited

U.S. PATENT DOCUMENTS

| 8,130,075 B1 * | 3/2012 | Hingole | G06F 3/0481 340/5.55 |
| 8,622,742 B2 | 1/2014 | Benko et al. | |
| 2009/0020343 A1 | 1/2009 | Rothkopf et al. | |
| 2012/0218190 A1 | 8/2012 | Pechanec et al. | |

\* cited by examiner

*Primary Examiner* — Vernal U Brown
(74) *Attorney, Agent, or Firm* — Morris & Kamlay LLP

(57) ABSTRACT

Systems and techniques are provided for a multi-state press and hold user interface. A state visualization may be displayed on a touchscreen. The state visualization may include a control for a controlled system and an indicator of a state of the controlled system. The indicator may be for an initial state of the controlled system. An indication of an initial touch input to the control may be received. It may be determined that touch input to the control has persisted for a threshold amount of time after the initial touch input to the control. An instruction may be sent to change state to the controlled system. The instruction may be based on the initial state of the controlled system. An updated state of the controlled system may be received. The indicator of the state visualization may be changed to an indicator for the updated state of the controlled system.

18 Claims, 9 Drawing Sheets

FIG. 1D
FIG. 1E
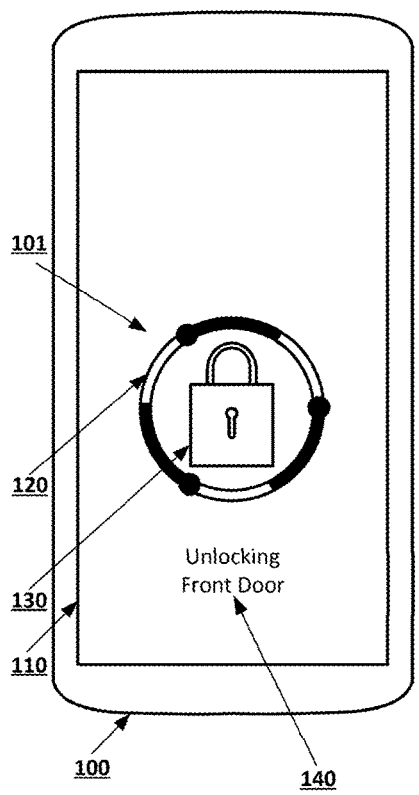
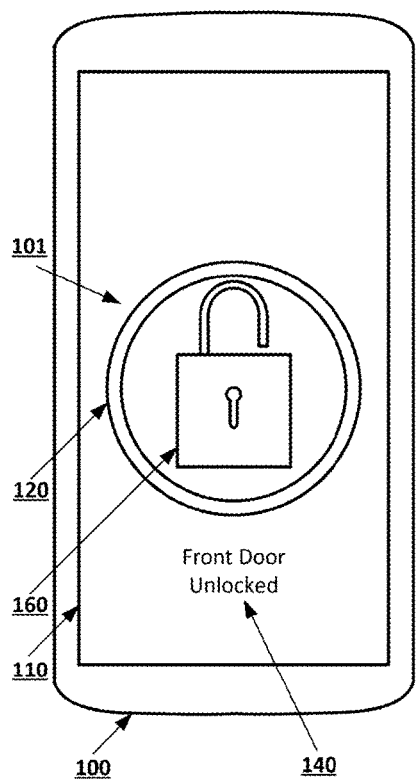

FIG. 2A
FIG. 2B
FIG. 2C
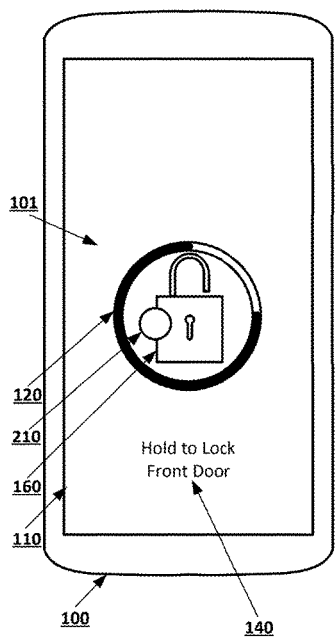
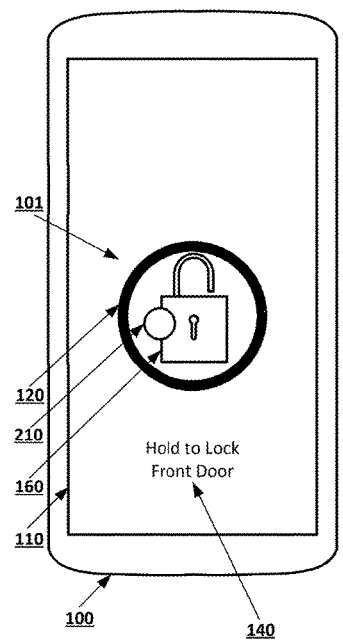
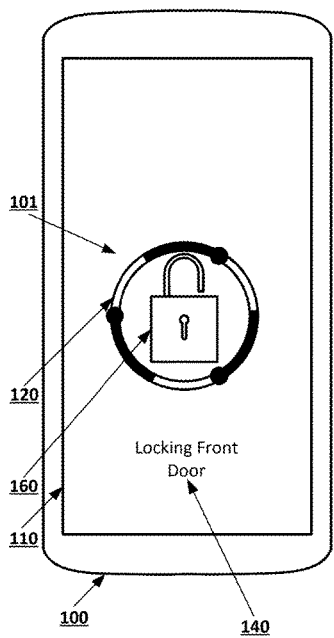

MULTI-STATE PRESS AND HOLD USER INTERFACE

BACKGROUND

Touchscreen input to a computing device may be used to control various systems and devices, which may be separate from the computing device. For example, a smartphone application may use touchscreen input to control a smart home environment for a person's home, including alarm systems and locks. Touchscreens may be subject to accidental touching by user, which may result in the accidental issuing of instructions to a controlled device or system.

BRIEF SUMMARY

According to an implementation of the disclosed subject matter, a state visualization may be displayed on a touchscreen. The state visualization may include a control for a controlled system and an indicator of a state of the controlled system. The indicator may be for an initial state of the controlled system. An indication of an initial touch input to the control may be received. Visual feedback to indicate the receiving of the initial touch input to the control may be displayed. It may be determined that touch input to the control has persisted for a threshold amount of time after the initial touch input to the control. A progress indicator may be displayed on the touchscreen while determining that touch input to the control has persisted for the threshold amount of time after the initial touch input to the control. The visual depiction of the progress indicator may be based on the initial state of the controlled system. An aspect of the progress indicator displayed when the initial state is a first state may be different from an aspect of the progress indicator displayed when the initial state is a second state. An instruction may be sent to change state to the controlled system. The instruction may be based on the initial state of the controlled system. An updated state of the controlled system may be received. The indicator of the state visualization may be changed to an indicator for the updated state of the controlled system.

An indication of a second initial touch input to the control may be received. It may be determined that touch input to the control has persisted for a second threshold amount of time after the second initial touch input to the control. A second instruction may be sent to change state to the controlled system. A second updated state of the controlled system may be received. The indicator of the state visualization may be changed to an indicator for the second updated state of the controlled system.

The second updated state of the controlled system may be the initial state if the controlled system. Determining that touch input to the control has persisted for a threshold amount of time after the initial touch input to the control may include starting a timer when the indication of the initial touch input to the control is received and running the timer for the threshold amount of time while the touch input persists to the control persists. The timer may expire after running for the threshold amount of time. The control may be activated when the timer expires. Displaying visual feedback to indicate the receiving of the initial touch input to the control further comprises one or more of changing a size of the state visualization, changing a color of the state visualization, changing a texture of the state visualization, and displaying a halo around the location of the initial touch input, and providing haptic feedback. Haptic feedback to indicate the receiving of the initial touch input to the control may be provided.

The controlled system may include a component of a smart home environment. The threshold amount of time may be greater than one second.

An additional visual indicator may be displayed after sending the instruction to change state to the controlled system and before receiving an updated state of the controlled system. The additional visual indicator is based on the instruction to change state sent to the controlled system.

An indication of a second initial touch input to the control may be received. It may be determined that touch input to the control has not persisted for a second threshold amount of time after the second initial touch input to the control. The control may not be activated. Determining that touch input to the control has not persisted for a second threshold amount of time after the second initial touch input to the control may include starting a timer when the indication of the second initial touch input to the control is received, running the timer for the amount of time the touch input persists to the control persists, and resetting the timer when the touch input stops before the timer has run for the second threshold amount of time.

The indicator of the state of the controlled system may include an icon visually representing the state of the controlled system.

According to an embodiment of the disclosed subject matter, a means for displaying a state visualization on a touchscreen, the state visualization including a control for a controlled system and an indicator of a state of the controlled system, wherein the indicator is for an initial state of the controlled system, a means for receiving an indication of an initial touch input to the control, a means for displaying visual feedback to indicate the receiving of the initial touch input to the control, a means for determining that touch input to the control has persisted for a threshold amount of time after the initial touch input to the control, a means for displaying, on the touchscreen, a progress indicator while determining that touch input to the control has persisted for the threshold amount of time after the initial touch input to the control, wherein the visual depiction of the progress indicator is based on the initial state of the controlled system, and wherein at least one aspect of the progress indicator displayed when the initial state is a first state is different from the at least one aspect of the progress indicator displayed when the initial state is a second state, a means for sending an instruction to change state to the controlled system, the instruction based on the initial state of the controlled system, a means for receiving an updated state of the controlled system, a means for changing the indicator of the state visualization to an indicator for the updated state of the controlled system, a means for receiving an indication of a second initial touch input to the control, a means for determining that touch input to the control has persisted for a second threshold amount of time after the second initial touch input to the control, a means for sending a second instruction to change state to the controlled system, a means for receiving a second updated state of the controlled system, a means for changing the indicator of the state visualization to an indicator for the second updated state of the controlled system, a means for starting a timer when the indication of the initial touch input to the control is received, a means for running the timer for the threshold amount of time while the touch input persists to the control persists, wherein the timer expires after running for the threshold amount of time, a means for displaying an additional visual indicator after sending the instruction to change state to the controlled system and before receiving an updated state of the controlled system, wherein the additional visual indicator is based on the instruction to change state sent to the controlled system, a means for receiving an indication of a second initial touch input to the control, a means for determining that touch input to the control has not persisted for a second threshold amount of time after the second initial touch input to the control, a means for not activating the control, a means for starting a timer when the indication of the second initial touch input to the control is received, a means for running the timer for the amount of time the touch input persists to the control persists, and a means for resetting the timer when the touch input stops before the timer has run for the second threshold amount of time, are included Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 1D shows an example multi-state press and hold user interface according to an implementation of the disclosed subject matter.

FIG. 1E shows an example multi-state press and hold user interface according to an implementation of the disclosed subject matter.

FIG. 2A shows an example multi-state press and hold user interface according to an implementation of the disclosed subject matter.

FIG. 2B shows an example multi-state press and hold user interface according to an implementation of the disclosed subject matter.

FIG. 2C shows an example multi-state press and hold user interface according to an implementation of the disclosed subject matter.

DETAILED DESCRIPTION

Figure 1A:
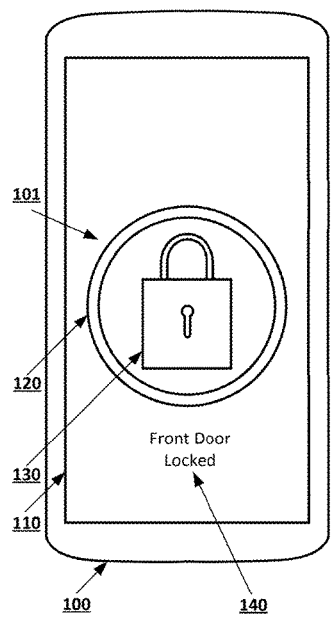
FIG. 1A shows an example multi-state press and hold user interface according to an implementation of the disclosed subject matter.

According to embodiments disclosed herein, a multi-state press and hold user interface may allow for the activation of a control on a touchscreen in a manner that may limit accidental activations and may track the state of the device or system being controlled. A user may be presented with a visual representation of both the state and the possible changes activating the control may make to that state. A computing device may include a touchscreen and an application for controlling a separate device or system, such as a smart home environment. The application may include a number of controls, which may be presented to a user of the computing device. The controls may be represented by an icon or other visual depiction that may represent a current state of the device or system controlled by the control. To activate the control and change the state of the controlled device or system, the user may press the control on the touchscreen, and may hold the press for some threshold amount of time. A visual representation of how much longer the user must hold their pressing of the control to activate the control may be displayed to the user. The visual representation may also provide some indication of the effect of activating the control. Other feedback may also be provided to the user to indicate that they have pressed, and are holding their pressing, of the control. After the user has maintained their pressing of the control for the threshold amount of time, the control may be activated, sending an instruction to the controlled device or system to change state. The instruction may be based on the current state of the controlled device or system. The visual representation of the control may be updated to reflect an updated state of the controlled device or system when the controlled device or system confirms that it has changed state in response to the instruction. Subsequent activation of the control may cause a different instruction to be sent to the controlled device or system based on the updated state.

For example, a smart home environment may be controlled from an application installed on a smartphone with a touchscreen. The smart home environment may include a number of components including, for example, automated locks. The application on the smartphone may be used to control the automated locks of the smart home environment. The application may include a multi-state press and hold user interface, which may present a user with a control for the automated locks, including a visual representation of the current state of the automated locks as reported by the smart home environment. For example, if the automated locks are currently locked, a locked padlock icon may be displayed on the smartphone. To unlock the automated locks, the user may press and hold the control displayed on the smartphone. When the user initially presses on the control a progress indicator, such as a circular progress bar, may be displayed. The circular progress bar may fill up as long as the user continues to hold their pressing of the control on the smartphone's touchscreen. A message may also be displayed, indicating the effect activation of the control may have on the state of the automated locks. Other feedback, such as the shrinking of the visual representation of the control, may also be provided on the user's initial touch of the control and may be maintained as long as the user is pressing the control. There may be a threshold amount of time for which the control must be held, for example, 1.5 seconds. If the user releases their pressing of the control before 1.5 seconds has elapsed, the circular progress bar may be reset and the control may not be activated. When the user holds their pressing of the control for 1.5 seconds, the control may be activated. An instruction may be sent to the smart home environment to unlock the automated locks. Once the automated locks have been successfully unlocked, the smart home environment may report the unlocked state of the automated locks to the smartphone application. The visual representation for the control may be updated, for example, to an unlocked padlock. If the user subsequently activates the control while the automated locks are unlocked, the instruction sent by the control may cause the smart home environment to lock the automated locks.

A visual representation for a control may be displayed on a touchscreen. The control may be, for example, part of an application running on a computing device. A user may select to access the control, for example, through a menu of the application. In some implementations, a control may be displayed as part of a notification from an application. For example, when an alarm of a smart home environment is triggered, a notification may be sent to a computing device running an application that may be able to control the smart home environment. The notification may include an indication of the triggered alarm, and may also cause the display of a control for the alarm.

The visual representation for a control displayed on a touchscreen may be based on the state of the device or system controlled by the control. The state may be received from the device or system, for example, before the visual representation is displayed. This may ensure that the current state of the device or system is properly represented to a user, so that a user does not use the control in an unintended manner. For example, a smartphone application, before causing a visual representation of a control to be displayed, may first send a request to a smart home environment for the current state of the device or system controlled by the control, such as, for example, the automated locks. The control may be not be displayed until the smartphone application has received a response from the smart home environment, allowing for the selection and display of the visual representation that correctly depicts the state of the device or system. This may prevent, for example, a visual representation indicating that automated locks are locked from being displayed when the automated locks are actually unlocked.

The visual representation may include any suitable combination of text and images to represent the state of the device or system controlled by the control. For example, a control for automated locks may appear as a locked padlock when the automated locks are locked, and an unlocked padlock when the automated locks are unlocked. Accompanying text may indicate that the automated locks are either "locked" or "unlocked". A control for an alarm may appear as speaker emitting sound waves when the alarm is active, and a speaker with no sound waves or an "x" when the alarm is silent or has been muted. The control may appear as a simulation of the user interface of the device or system controlled by the control. For example, a control for a lock may appear as a lever to throw a deadbolt, and may be displayed oriented in the same manner as the actual deadbolt lock which is controlled by the control. Accompanying text may indicate that the alarm is "active" or "silenced." The text may also indicate a reason for the alarm, such as the detection of smoke, carbon monoxide, or other environmental hazard, indicators of an intrusion such as a triggered motion sensor, window sensor, door sensor, or detected failure to disarm the alarm system at a device within the home, or due to user activation of the alarm. Other text may be displayed with the visual representation of the control, such as, for example, text indicating actions a user should take before silencing alarm, such as evaluating the source of a smoke alarm, or text indicating the effects of activation of the control, for example, displaying "hold to unlock" with a control for automated locks which are currently locked.

To activate a control, a user may press on the control on a touchscreen. The user's initial pressing of the control may start a timer, which may track how long the user holds their pressing of the control. A progress indicator that visually depicts the length of the time the user has held their pressing of the control, or length of time remaining on the timer until activation of the control, may be displayed along with the visual representation of the control. The progress indicator may be, for example, a circular progress bar, a straight progress bar, a countdown timer, or any other suitable visualization of elapsing time. The progress indicator may also visually indicate the type of instruction that will be sent on activation of the control based on the current state of the controlled device or system. For example, the progress indicator may be a circular progress bar that may fill up in the clockwise direction when the instruction that will be sent will unlock automated locks, and may fill up in the counterclockwise direction when the instruction that will be sent will lock automated locks. The progress indicator may use any suitable visual indicators, including, for example, color changes, to indicate the instruction that will be sent when the control is activated. Other feedback may also be provided to the user on their initial touch of the control. For example, the visual representation of the control may change size, color, or texture, a halo or other visual indicator may be displayed around the location of the user's touch, or vibration or other haptic feedback may be provided. The feedback may be maintained for as long as the user maintains their pressing of the control.

The timer may run, and the progress indicator may indicate progress towards the activation of the control, for as long as the user maintains their pressing of the control on the touchscreen. Any break in the pressing of the control, for example, due to the user lifting their finger off the touchscreen, before the timer has expired may cause the timer and the progress indicator to reset, and the control may not activate. Whether the user is pressing the control may be determined in any suitable manner, for example, based on the type of touchscreen in use. For example, the user may need to apply more pressure to hold their pressing of the control when the touchscreen is a resistive touchscreen than when the touchscreen is a capacitive touchscreen.

The timer may expire after the user has held their pressing of the control for a threshold amount of time. This may activate the control. The threshold amount of time may be any suitable amount of time, and different controls may have different thresholds. For example, a control for an alarm may have a threshold of 1.25 seconds, while a control for automated locks may have threshold of 1.5 seconds. Thresholds may be set for controls based on, for example, the possible consequences of accidental activation of the control.

On activation of the control, an instruction may be sent from the computing device on which the control was displayed to the device or system controlled by the control. The instruction may be selected based on the current state of the device or system controlled by the control. For example, if the control is for automated locks, the instruction sent on activation of the control may be an unlock instruction when the current state of the automated locks is locked, and a lock instruction when the current state of the automated locks in unlocked. The instruction may be sent using any suitable type of wired or wireless communication, and may be sent directly to the controlled device or system, or may be passed through any suitable network.

The instruction may be received and implemented by the controlled device or system. For example, an instruction to unlock automated locks may be received by a smart home environment, for example, at a hub computing device, which may relay the instruction to the automated locks directly, may translate the instruction appropriately before relaying to the automated locks, or may directly control the mechanical or electrical mechanisms of the automated locks. The controlled device or system may implement the instruction. For example, the smart home environment may unlock the automated locks, either through the automated locks receiving the instruction and unlocking themselves, or through the hub computing device causing the automated locks to unlock, for example, through controlling the mechanical or electrical mechanisms of the automated locks. When the instruction has been successfully implemented, the controlled device or system may send a confirmation to the computing device from which the instruction was received, including, for example, an updated state of the controlled device or system. For example, the hub computing device of the smart home environment may send, or relay from the automated locks, a message indicating that the automated locks were successfully unlocked. Any failure to implement the instruction may also be sent to the computing device, and may indicate, for example, any known reason for the failure.

While the instruction is being sent to and implemented on the controlled device or system, the visual representation for the control displayed to the user may be updated to indicate that implementation of the instruction is in progress. For example, the progress indicator may be reset, and additional visual indicators may be displayed to indicate that the computing device is awaiting confirmation that the instruction is successfully implemented. The additional visual indicator may be, for example, a rotating element. The additional visual indicator may provide an indication of the instruction that was sent. For example, a rotating element may rotate in a first direction to indicate that an instruction to lock automated locks was sent, and in a second, opposite direction to indicate that an instruction to lock the automated locks was sent. The additional visual indicator may also use color and text to indicate that the instruction that was sent to the controlled device or system.

The confirmation that the instruction was successfully implemented may be received for example, by the computing device which sent the instruction. The confirmation may include an updated state for the controlled device or system. The visual representation for the control displayed to the user may be updated to indicate the updated state for the controlled device or system. For example, a locked padlock icon may be changed to an unlocked padlock icon to indicate the unlocking of automated locks, or a speaker icon may be changed from having sound waves to having no sound waves, to indicate a silenced alarm.

In some implementations, the controlled device or system may have more than two states which may be represented and controlled by the control. For example, a control for automated locks may have a state with all doors being locked, a state with a front door being unlocked while all other doors are locked, and a state with all doors being unlocked. Each state may have a separate visual representation that may be displayed for the control on the touchscreen. The multi-state press and hold user interface may allow for switching between the states using the control in any suitable manner. For example, pressing and holding the control on the touchscreen for a first length of time may send an instruction to the controlled device or system to switch from the current state to a subsequent state, while holding the control for a second length of time, longer than the first length of time, may send an instruction to the controlled device or system to switch from the current state to another subsequent state.

For example, pressing and holding the control for automated locks for 1.5 seconds may send an instruction to the automated locks to switch to the next state in a sequence of states, for example, from all doors locked to only the front door being unlocked, from only the front being unlocked to all doors being unlocked, or from all doors being unlocked to all doors being locked. Pressing and hold the control for the automated locks for 3 seconds may send an instruction to the automated locks to skip two states ahead in the sequence of states, for example, from all doors locked to all doors unlocked, from only the front door being unlocked to all doors locked, or from all doors being unlocked to only the front door being unlocked. The longer press and hold may be visually represented in any suitable manner. For example, the progress indicator may fill up for the first length of time in a first color, and then my fill up again for the second length of time in a second color that replaces the first color as the progress indicator fills. The control may be activated once the press has been held for the first length of time, and may send the instruction associated with the first length of time if the hold is released before the second length of time elapses once the first length of time has elapsed.

In some implementations, non-visual representations may be used instead of visual representations, for example, to represent the state of the device or system being controlled and the progress indicator. Any suitable combination of auditory cues and haptic feedback through a touchscreen may be used to allow the use of a multi-state press and hold user interface in conditions where the screen itself is not visible or the user is visually impaired. For example, the progress indicator may be represented through an audible countdown, through a series of vibrations of a computing device, or through a representation of a tactile progress bar implemented through haptic feedback.

In some implementations, input may be received from a user through a non-touchscreen device. For example, a user may use a mouse, touchpad, trackball, pointing stick, other input device to select and activate a control. For example, user may position a mouse pointer over a control displayed on a screen, and may press and hold a mouse button to activate the control, rather than pressing on the control directly on a touchscreen.

Communication between a computing device and a controlled device or system may occur in any suitable manner. For example, the computing device may communicate directly with the controlled device or system, for example, through a direct Bluetooth, Wi-Fi, or wired connection, or indirectly, for example, through a suitable network connection. In some implementations, the controlled device or system and computing device may communicate through a server which may be separate from the controlled device or system, and may act as a gateway to the controlled device or system. For example, a smart home environment may have a gateway site hosted on a server outside of the smart home environment which may be accessible to the computing device. The gateway site may include, for example, a website accessible via any suitable web browser, and APIs for access via other applications. The smart home environment may provide state updates to the gateway site, and the computing device may retrieve the state updates from the gateway site. The computing device may use the gateway site to control the smart home environment, for example, through an application that may interface with the gateway site, or through a web browser.

FIG. 1A shows an example multi-state press and hold user interface according to an implementation of the disclosed subject matter. A computing device 100 may include a touchscreen display 110. The computing device 100 may be, for example, a smartphone, tablet, laptop, wearable device, or control panel of a hub computing device. The touchscreen display 110 may use any suitable type of touchscreen, such as, for example, a capacitive or resistive touchscreen, to accept touch input. The touch input may be received based on contact from a person, stylus, or any other suitable object.

The computing device 100 may run an application which may be used to control a device or system separate from the computing device 100, such as, for example, a hub computing device for a smart home environment. A user may select, within the application, a specific control for the controlled device or system. For example, the user may select the control for the automated locks in a smart home environment. The control 101 may be displayed on the touchscreen display 110. The control 101 may include a progress indicator 120 and a state icon 130. The progress indicator 120 may be any suitable size and shape, and may be a circle around the state icon 130 which may also delimit the area which may be pressed on the touchscreen display 110 to activate the control 101. The state icon 130 may be a visual representation for the control 101, and may represent the current state of the device or system, such as the automated locks, controlled by the control 101. The current state may be requested from the controlled device or system when the user selects the control for the controlled device or system on the computing device 100, so that the proper state icon, for example, the state icon 130, may be displayed on the touchscreen display 110. For example, the state icon 130 for locked automated locks may be a locked padlock icon. A message 140 may also be displayed, which may provide textual information to a user, such as, for example, the state indicated by the state icon 130. The textual information provided by the message 140 may be any suitable information regarding the control 101, the state of the system or device controlled by the control 101, and any instructions that the control 101 may be used to send to the controlled system or device. For example, the message 140 may indicate the state of automated locks controlled by the control, for example, stating where a single door is locked or unlocked, providing the state of two locks on one door, providing the state of locks on different doors, informing the user that activating the control 101 may both unlock a lock and change an alarm mode, and so on.

Figure 1B:
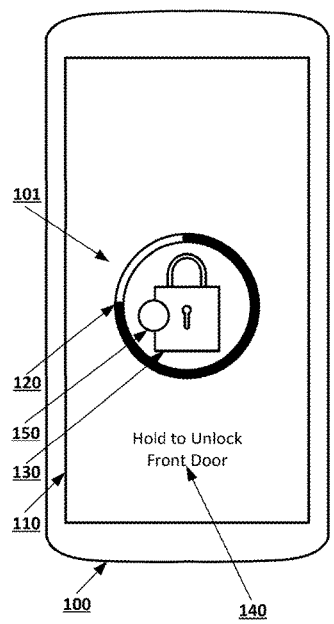
FIG. 1B shows an example multi-state press and hold user interface according to an implementation of the disclosed subject matter.

FIG. 1B shows an example multi-state press and hold user interface according to an implementation of the disclosed subject matter. A user may attempt to activate the control 101 by pressing on the touchscreen display 110. The contact area 150 may be the point of contact between the user's finger or stylus and the touchscreen display 110. When the contact area 150 is on the control 101, for example, within the area delimited by the progress indicator 120, the user may have pressed on the control 101. The control 101 may change size, for example, shrink on the initial touch from the user, providing visual feedback to the user that they have touched the control 101. Other feedback, such as changes of colors or textures used in the visual representation of the control 101, or elsewhere on the touchscreen display 110, or haptic feedback, may also be provided to the user. The progress indicator 120 may begin filling in conjunction with the start of the timer counting towards the activation of the control 101. For example, the progress indicator 120 may be circular, and may fill in a clockwise direction for as long as the user holds their pressing of the control 101. The progress indicator 120 may fill in any suitable manner. For example, the progress indicator 120 may fill in synchronization with the timer, such that the progress indicator 120 may be half-filled when the timer is halfway to the threshold amount of time to activate the control 101. In some implementations, the progress indicator 120 may be a visual timer, which may countdown from, or up to, the threshold amount of time for activation of the control 101. The progress indicator 120 may also be a percentage counter. The message 140 may change, for example, indicating to the user that their pressing of the control 101 needs to be held to activate the control 101, and the result of the instruction that will be sent when the control 101 is activated. For example, the message 140 may indicate that the user should hold their pressing of the control 101 to send an instruction that will unlock a front door lock controlled by the control 101.

Figure 1C:
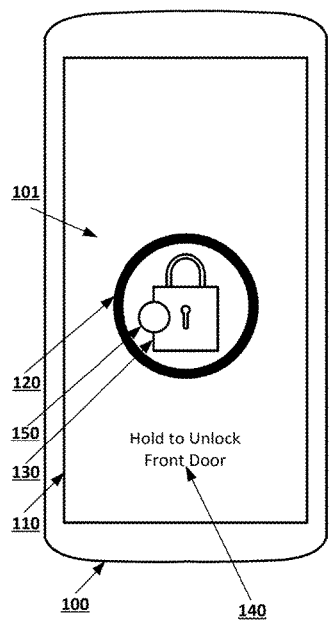
FIG. 1C shows an example multi-state press and hold user interface according to an implementation of the disclosed subject matter.

FIG. 1C shows an example multi-state press and hold user interface according to an implementation of the disclosed subject matter. As long as the user maintains contact with the control 101 on the touchscreen display 110, for example, keeping their finger pressed on the contact area 150, the timer may run and the progress indicator 120 may fill. Changes made to the visual representation of the control 101, or elsewhere on the touchscreen display 110, or haptic feedback, may continue, which may provide further feedback to indicate to the user that they are maintaining contact with the control 101. For example, the control 101 may remain shrunken in size, after shrinking on the user's initial touch of the control 101. If the user maintains contact for the length of the timer, the progress indicator 120 may completely fill, indicating that the timer has expired and the user has activated the control 101.

FIG. 1D shows an example multi-state press and hold user interface according to an implementation of the disclosed subject matter. The control 101 may be activated once the user has maintained their press and hold of the control 101 on the touchscreen display 110 for the threshold amount of time, as indicated by, for example, the filling of the progress indicator 120. The user may release their pressing of the control 101 once the control 101 has been activated. The progress indicator 120 may be reset, for example, unfilled, and may be used to display an additional visual indicator. The additional visual indicator may be, for example, disjoint filled segments of the progress indicator 120 which rotate around the progress indicator. The segments may rotate in the same direction that the progress indicator 120 filled during the press and hold of the control 101. The message 140 may change to indicate to the user that the control 101 has been activated and the instruction from the control 101 has been sent from the computing device 100 and is being implemented on the controlled device or system. For example, the message 140 may indicate that the front door lock of the smart home environment is being unlocked. The instruction sent when the control 101 is activated may be based on the current state of the controlled device or system, for example, as represented by the state icon 130. For example, the state icon 130 may represent that the front door is locked, and the instruction sent on activation of the control 101 when the state icon 130 is displayed may be an instruction to unlock the front door. The additional visual indicator may be displayed on the touchscreen display 110 until the computing device 100 receives confirmation from the controlled device or system that the instruction has been implemented successfully. For example, the segments may continue to rotate around the progress indicator 120 until the computing device 100 receives confirmation that the front door has been successfully locked. Changes made to the visual representation of the control 101, or elsewhere on the touchscreen display 110, or haptic feedback, may continue while the additional visual indicators are displayed after the activation of the control 101, even if the user is no longer holding their pressing of the control 101. For example, the control 101 may remain shrunken in size, after shrinking on the user's initial touch of the control 101.

FIG. 1E shows an example multi-state press and hold user interface according to an implementation of the disclosed subject matter. The computing device 100 may receive confirmation from the controlled device or system that the instruction sent on activation of the control 101 was successfully implemented. For example, the computing device 100 may receive confirmation from a hub computing device of a smart home environment that the front door has been successfully unlocked in response to an instruction sent on activation of the control 101. The confirmation may include an updated state for the controlled device or system. The additional visual indicator displayed on the progress indicator 120 may no longer be displayed. The state icon 130 may be changed to a state icon 160, which may visually represent the updated state of the controlled device or system. For example, the state icon 160 may be an unlocked padlock, which may visually represent that the front door is unlocked. The message 140 may change to indicate the updated state of the controlled device or system to the user. Changes made to the visual representation of the control 101 on the user's initial touch may be undone. For example, a shrunken control 101 may returned to its original size.

FIG. 2A shows an example multi-state press and hold user interface according to an implementation of the disclosed subject matter. A user may again attempt to activate the control 101 by pressing on the touchscreen display 110. The state icon 160 may be displayed on the touchscreen display 110. This may indicate, for example, that the controlled device or system is in a different state than when the state icon 130 was displayed on the touchscreen display 110. For example, the front door lock of a smart home environment may be unlocked. The front door may have been unlocked based on an instruction sent due to a previous activation of the control 101, or in any other suitable manner, such as direct interaction with the hub computing device of the smart home environment by a user. Contact area 210 may be the point of contact between the user's finger or stylus and the touchscreen display 110. When the contact area 210 is on the control 101, for example, within the area delimited by the progress indicator 120, the user may have pressed on the control 101. The control 101 may change size, for example, shrink on the initial touch from the user, providing visual feedback to the user that they have touched the control 101. Other feedback, such as changes of colors or textures used in the visual representation of the control 101, or elsewhere on the touchscreen display 110, or haptic feedback, may also be provided to the user. The progress indicator 120 may begin filling in conjunction with the start of the timer counting towards the activation of the control 101. The progress indicator 120 may fill in a manner that may be distinguishable from the manner in which the progress indicator 120 fills when the state icon 130 is displayed. For example, the progress indicator 120 may be circular, and may fill in a counterclockwise direction for as long as the user holds their pressing of the control 101. The progress indicator 120 may also use a different color, different textured fill, or if a timer is shown, may count up instead of down, or vice versa. This may provide a way in addition to the state icons 130 and 160 for a user to visually determine which instruction will be sent to the controlled device or system on activation of the control 101. The message 140 may change, for example, indicating to the user that their pressing of the control 101 needs to be held to activate the control 101, and the result of the instruction that will be sent when the control 101 is activated. For example, the message 140 may indicate that the user should hold their pressing of the control 101 to send an instruction that will lock of the lock or locks on the front door controlled by the control 101.

FIG. 2B shows an example multi-state press and hold user interface according to an implementation of the disclosed subject matter. As long as the user maintains contact with the control 101 on the touchscreen display 110, for example, keeping their finger pressed on the contact area 210, the timer may run and the progress indicator 120 may fill. Changes made to the visual representation of the control 101, or elsewhere on the touchscreen display 110, or haptic feedback, may continue, which may provide further feedback to indicate to the user that they are maintaining contact with the control 101. For example, the control 101 may remain shrunken in size, after shrinking on the user's initial touch of the control 101. If the user maintains contact for the length of the timer, the progress indicator 120 may completely fill, indicating that the timer has expired and the user has activated the control 101.

FIG. 2C shows an example multi-state press and hold user interface according to an implementation of the disclosed subject matter. The control 101 may be activated once the user has maintained their press and hold of the control 101 on the touchscreen display 110 for the threshold amount of time, as indicated by, for example, the filling of the progress indicator 120. The user may release their pressing of the control 101 once the control 101 has been activated. The progress indicator 120 may be reset, for example, unfilled, and may be used to display an additional visual indicator. The additional visual indicator may be, for example, disjoint filled segments of the progress indicator 120 which rotate around the progress indicator. The segments may rotate in the same direction that the progress indicator 120 filled during the press and hold of the control 101. For example the segments may rotate counter-clockwise, allowing for the user to visually distinguish between activation of the control 101 from when the state icon 130 was displayed. Any suitable animations may be used to allow for a user to visually distinguish states of the controlled device or system, and the instruction that will be sent on activation of the control 101, based on the progress indicator 120 The message 140 may change to indicate to the user that the control 101 has been activated and the instruction from the control 101 has been sent from the computing device 100 and is being implemented on the controlled device or system. For example, the message 140 may indicate that the front door is being locked. The instruction sent when the control 101 is activated may be based on the current state of the controlled device or system, for example, as represented by the state icon 160. For example, the state icon 160 may represent that the front door is unlocked, and the instruction sent on activation of the control 101 when the state icon 160 is displayed may be an instruction to lock the front door. The additional visual indicator may be displayed on the touchscreen display 110 until the computing device 100 receives confirmation from the controlled device or system that the instruction has been implemented successfully. For example, the segments may continue to rotate around the progress indicator 120 until the computing device 100 receives confirmation that the front door has been successfully locked. On confirmation that the instruction was implemented successfully, the state icon 160 may be changed to the state icon 130, the progress indicator 120 may be reset, and the message 140 may be changed, for example, as depicted in FIG. 1A. Changes made to the visual representation of the control 101, or elsewhere on the touchscreen display 110, or haptic feedback, may continue while the additional visual indicators are displayed after the activation of the control 101, even if the user is no longer holding their pressing of the control 101. For example, the control 101 may remain shrunken in size, after shrinking on the user's initial touch of the control 101.

Figure 3:
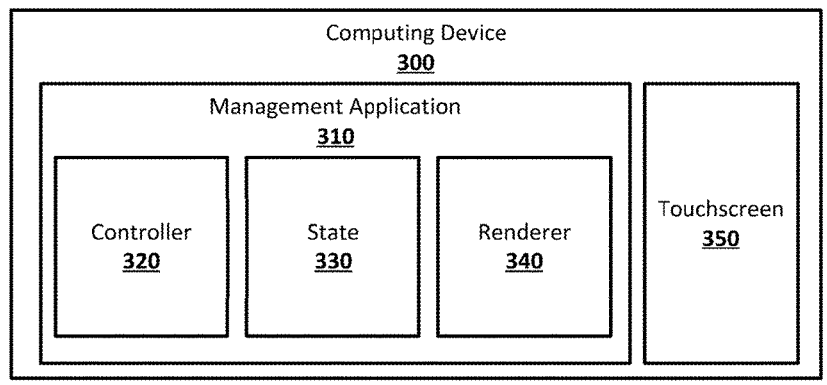
FIG. 3 shows an example system suitable for a multi-state press and hold user interface according to an implementation of the disclosed subject matter.

FIG. 3 shows an example system suitable for a multi-state press and hold user interface according to an implementation of the disclosed subject matter. A computing device 300 may include a management application 310 and a touchscreen 350. The computing device 300 may be any suitable device, such as, for example, a computer 20 as described in FIG. 12, for implementing the management application 310. The computing device 300 may be a single computing device, or may include multiple connected computing devices, and may be, for example, a smartphone, tablet, laptop, desktop, wearable device, hub computing device for a smart home environment, or other computing device that may be used to control a separate device or system. The touchscreen 350 may be a part of the computing device 300, or may be separate from the computing device 300. For example, the touchscreen 350 may be a touchscreen display on a smartphone, a monitor connected to a laptop, or other display receiving graphics output from the computing device 300. The management application 310 may be any suitable combination of hardware and software, such as an application, on the computing device 300 for managing a controlled device or system separate from the computing device 300.

The management application 310 may include a controller 320 and a renderer 340, and may store a state 330. The controller 320 may be any suitable combination of hardware and software for communication with and controlling a separate device or system. For example, the controller 320 may be able to send requests and instructions to, and receive state updates from, a smart home environment and the various devices and systems which may be components of the smart home environment, such as automated locks, alarms, sensors, and computing devices such as a hub computing device. The controller 320 may communicate with a controlled device or system in any suitable manner, for example, communicating through a direct connection to the controlled device or system based on physical proximity or through a virtual private network over a network, such as a cellular network or the Internet, or indirectly, for example, through a gateway site for the controlled device or system that is hosted separately from the controlled device or system. The controller 320 may be able to send instructions to controlled devices or systems, which may result in the controlled devices or systems changing state. The controller 320 may be able to receive state updates from controlled devices or systems, which may be stored, for example, as the state 330 within the management application 310. When sending instructions to controlled devices and systems, the controller 320 may be able select an appropriate instruction based on the state 330 for the controlled device or system. The controller 320 may also track the timer for the activation of the control 101, for example, starting the timer when a press and hold of the control 101 is detected and activating the control 101 if the pressing is held until the timer expires.

The state 330 may be an indication of the state of a controlled device or system, and may be stored within the management application 310. The state 330 may be stored within the working memory for the management application 310, and may also be stored, for example, in non-volatile storage of the computing device 300. To ensure that the state of a controlled device or system is appropriately reflected by the state 330, the controller 320 may be able to request and receive state updates from controlled devices and systems. The controller 320 may make a request for an updated state before a control, such as the control 101, is displayed to a user, instead of using a previously stored state 330, as the state of the controlled device or system may have changed state due to an instruction from a device other than computing device 300 between the last time the state 330 was updated and the request by the user to view the control 101. The state 330 may be updated frequently, for example, on a scheduled basis or through pushing of any state updates to the computing device 300 from the controlled device or system.

The renderer 340 may be any suitable combination of hardware and software for rendering graphics to be displayed on the touchscreen 350. The renderer 340 may be able to select appropriate graphics for the visual representation of the control 101. For example, the renderer 340 may select the appropriate state icon, for example either the state icon 130 or the state icon 160, for display on the touchscreen 350 based on the state 330 of the device or system controlled by the control 101. The renderer 340 may be able to render and update the progress indicator 120 based on the timer kept by the controller 320 and the state 330 of the controlled device or system. For example, the renderer 340 may render the progress indicator 120 as a circular progress bar, and may fill the progress indicator 120 clockwise or counterclockwise, synchronized with the timer of the controller 320, based on the state 330. The renderer 340 may also render the appropriate additional visual indicator, for example, rotating disjointed segments, based on the state 330 when the control 101 has been activated. The renderer 340 may also render textual indicators, such as the message 140, providing further indication of the status of the control 101 and the state 330 of controlled devices and systems.

Figure 4:
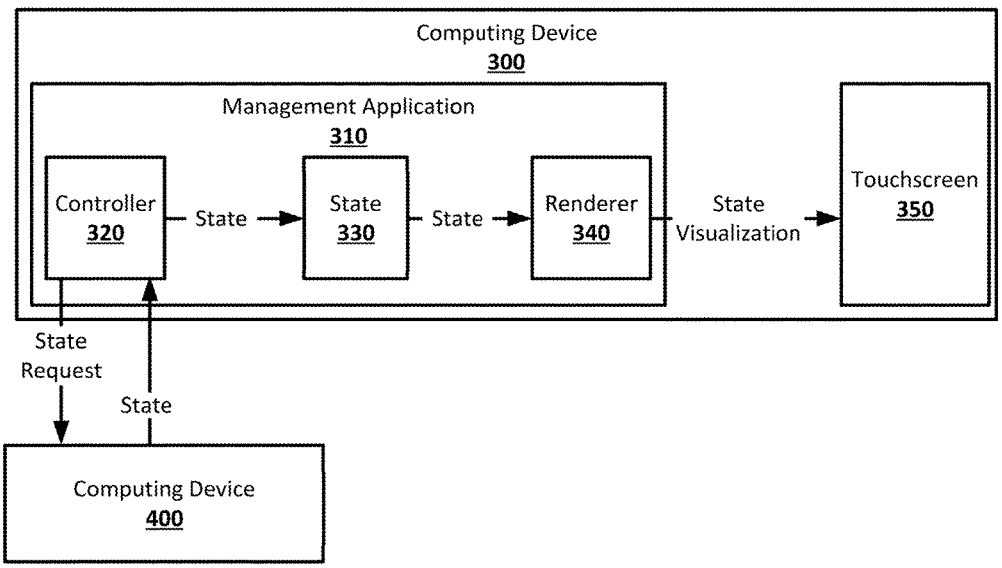
FIG. 4 shows an example arrangement suitable for a multi-state press and hold user interface according to an implementation of the disclosed subject matter.

FIG. 4 shows an example arrangement suitable for a multi-state press and hold user interface according to an implementation of the disclosed subject matter. A user may select to display a control, such as the control 101, for a controlled device or system of the computing device 400 on the touchscreen 350 of the computing device 300. The computing device 400 may a computing device that includes the controlled device or system as a component or may communicate with the controlled device or system, such as for example, the hub computing device of a smart home environment which may be in direct communication with a number of controlled devices and systems, or may be an on-board computing device for a controlled device or system, such as the on-board processor and other computational resources of an automated lock. The control 101 may be a control for the controlled device or system of the computing device 400.

Before displaying the control 101 to the user, the controller 320 may request the state of the controlled device or system from the computing device 400. The computing device 400 may respond with its current state. For example, a hub computing device for a smart home environment may receive a request for the current state of the front door lock, and may respond that the front door is locked. The controller 320 may store the state received from the computing device 400 as the state 330.

The renderer 340 may use the state 330 to render an appropriate state visualization for display on the touchscreen 350. The state visualization may include, for example, a visualization of the control 101, which may include an appropriate state icon selected based on the state 330. For example, the state icon 130 may be selected when the state 330 indicates that an automated lock or automated locks available through the computing device 400 are locked, and the state icon 160 may be selected when the state 330 indicates the automated lock or automated locks are unlocked. The state visualization may include an appropriate progress indicator 120, such as, for example, a circular progress bar around the selected state icon, and a message 140, which may textually indicate the state of the controlled device or system of the computing device 400. The state visualization, including the control 101, may be displayed to the user on the touchscreen 350.

Figure 5:
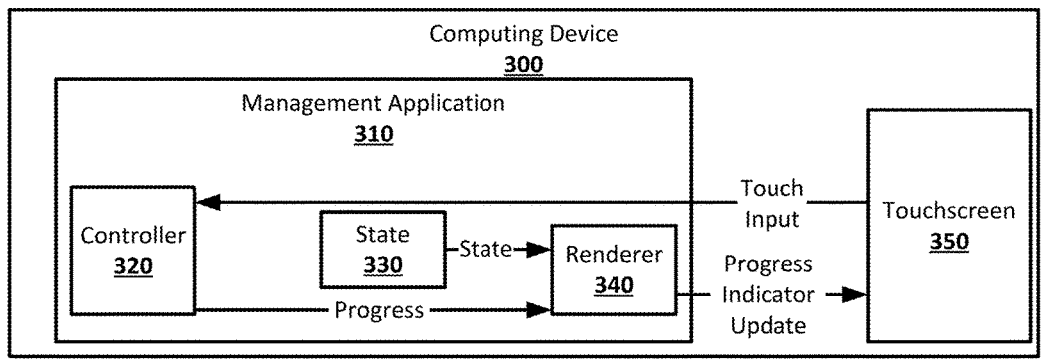
FIG. 5 shows an example arrangement suitable for a multi-state press and hold user interface according to an implementation of the disclosed subject matter.

FIG. 5 shows an example arrangement suitable for a multi-state press and hold user interface according to an implementation of the disclosed subject matter. The user may attempt to activate the control 101 displayed on the touchscreen 350. The user may press on the control 101 as displayed on the touchscreen 150, for example, on the displayed state icon or within the area delimited by, for example, the progress indicator 120, which may be a circular progress bar. An indication of touch input on the control 101 may be sent to the controller 320, which may start the timer for the activation of the control 101. The progress of the timer towards the activation of the control 101 may be received by the renderer 340, which may render a progress indicator update to be displayed on the touchscreen 350 based on the state 330. For example, the renderer 340 may render the filling of the progress indicator 120, which may be a circular progress bar, in a clockwise direction when the state 330 indicates that, for example, an automated lock of a smart home environment are currently locked. The renderer 340 may render changes to the visual representation of the control 101, or elsewhere on the touchscreen display 110. For example, the renderer 340 may change the size, for example, shrink, the control 101, providing visual feedback to the user that they have touched the control 101. Haptic feedback may be provided to the user. The renderer 340 may also update any textual information displayed on the touchscreen 350, for example, changing the message 140 to indicate to the user that they should continue to hold their pressing of the control 101 to unlock the front door.

The timer of the controller 320 may continue to run, and the renderer 340 may continually update the progress indicator 120, for as long as the touchscreen 350 indicates to the controller 320 that the user is touching, or holding their pressing of, the control 101. If the touchscreen 350 indicates that the user has released their pressing of the control 101 before the timer of the controller 320 expires, the timer may be reset. The renderer 340 may update the progress indicator 120 to reset it, for example, to an unfilled state on the touchscreen 350, and may update any textual information, for example, indicating the current state 330 for the controlled device or system, which may not have changed from when the user began pressing the control 101. Subsequent pressing of the control 101 on the touchscreen 350 by the user may restart the timer and cause the renderer 340 to start refilling the progress indicator 120.

Figure 6:
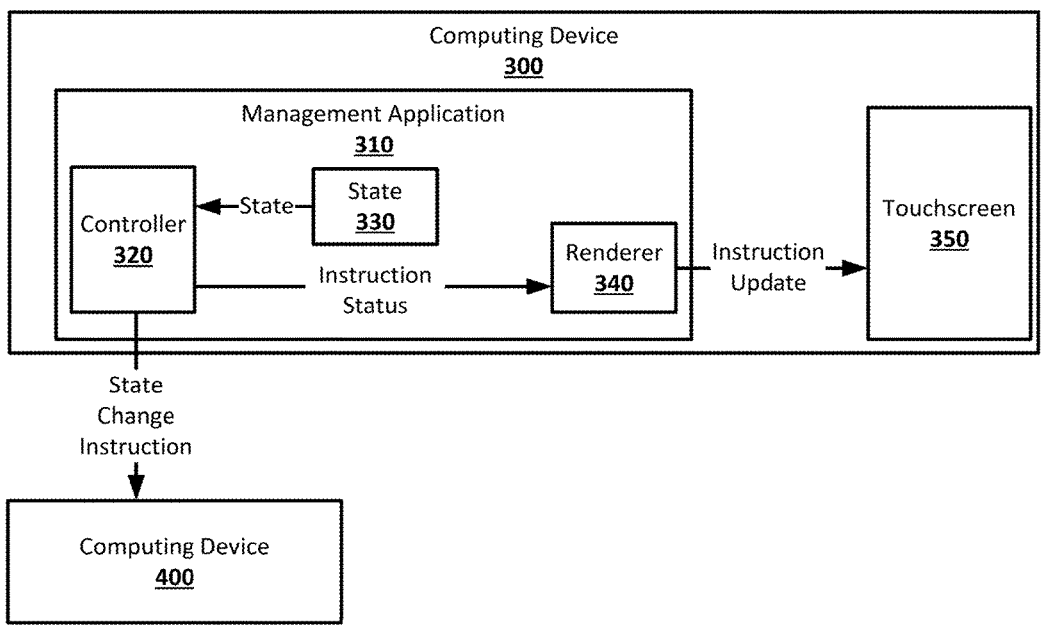
FIG. 6 shows an example arrangement suitable for a multi-state press and hold user interface according to an implementation of the disclosed subject matter.

FIG. 6 shows an example arrangement suitable for a multi-state press and hold user interface according to an implementation of the disclosed subject matter. When the timer expires, due to the user holding their pressing of the control 101 on the touchscreen 350 for the threshold amount of time, the control 101 may be activated. The controller 320 may send a state change instruction to the computing device 400 based on current state 330 of the controlled device or system. For example, the control 101 may control the front door lock of a smart home environment. The controller 320 may check the current state 330 of the front door lock, which may have been received before the control 101 was displayed to the user, and may determine which state change instruction to send based on the state 330. For example, if the state 330 indicates that the front door is locked, the state change instruction may be to unlock the front door. While the controller 320 waits for confirmation from the computing device 400 that the state change instruction was successfully implemented, the controller 320 may indicate the status of the instruction to the renderer 340. For example, the status may indicate that implementation of the instruction on the controlled device or system is in progress. The renderer 340 may render, for display on the touchscreen 350, an update on the status of the instruction, such as an additional visual indicator or textual update. The additional visual indicator or textual update may indicate that the state change has been sent to the computing device 400 and the controller 320 is waiting for confirmation that the state change instruction has been successfully implemented on the controlled device or system. The renderer 340 may continue to render the control 101 with any changes made on the user's initial touch, such as, for example, rendering a shrunken control 101. Haptic feedback may continue to be provided.

Figure 7:
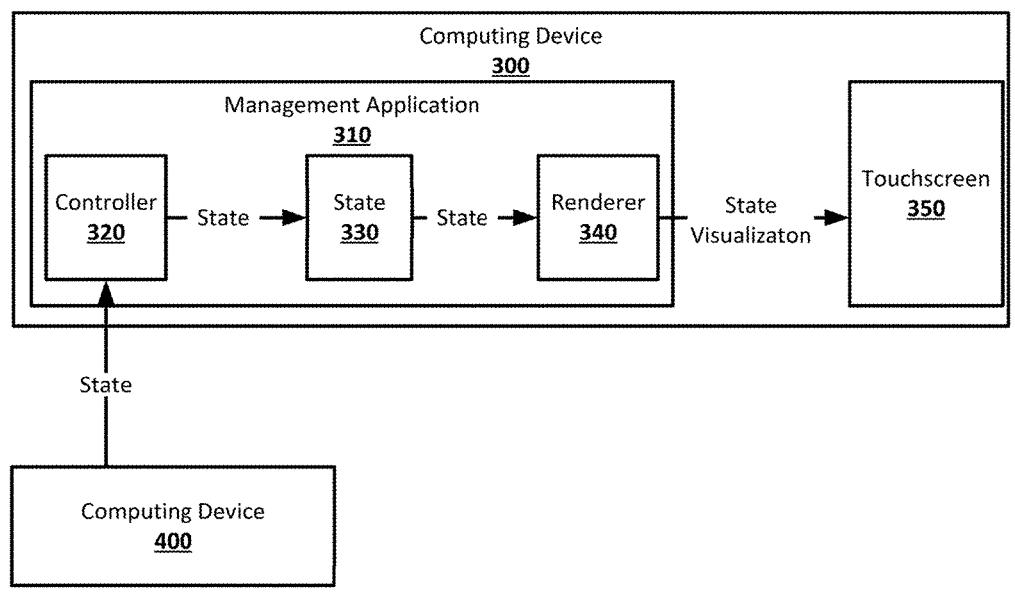
FIG. 7 shows an example arrangement suitable for a multi-state press and hold user interface according to an implementation of the disclosed subject matter.

FIG. 7 shows an example arrangement suitable for a multi-state press and hold user interface according to an implementation of the disclosed subject matter. After successfully implementing, or failing to implement, the state change instruction from the controller 320, the computing device 400 may send an updated current state to the controller 320. For example, the hub computing device of a smart home environment may have successfully implemented a state change instruction to unlock the front door. The hub computing device may send the state of the automated lock, such as the front door lock, as unlocked, to the controller 320 on the computing device 300. The controller 320 may store the received state as the state 330, replacing a previously stored state for the controlled device or system. The renderer 340 may use the state 330 to render an appropriate state visualization for display on the touchscreen

350. For example, if the state icon 130 had previously been displayed as the state visualization due to the front door being locked, and the state 330 has been changed to indicate that the front door is now unlocked, the state icon 160 may be selected for display with the state visualization. This may provide visual confirmation that the control 101 was successfully activated by the user and the state of the controlled device or system was successfully changed. The state visualization may also include the progress indicator 120, and the message 140, which may textually indicate the state of the controlled device or system of the computing device 400. Changes made to the control 101 on the user's initial touch of the control 101 may be undone. For example, a shrunken control 101 may be returned to original size. Haptic feedback may cease. The user may subsequently press and hold the control 101 to again activate the control 101 and change the state of the controlled device or system, for example, relocking automated locks which have been unlocked. The same control 101 may be used to switch a controlled device or system between available state repeatedly based on pressing and holding of the control 101, with the state visualization being updated to reflect state changes and allow a user to visually distinguish between current states of the controlled device or system and the instruction that will be sent on activation of the control 101.

If the state received from the computing device 400 is the same as the state received from the computing device 400 before the activation of the control 101, the controlled device or system may not have changed state, indicating a failure to indicate the state change instruction. The renderer 340 may select the appropriate state icon for the state, which may be the state icon that was displayed as part of the initial state visualization. For example, if the state icon 130 was displayed initially, indicating that the front door is locked, and the state 330 received from the computing device 400 after the activation of the control 101 indicates that the front door is still locked, the renderer 340 may again use the state icon 130 for the state visualization. This may visually indicate to the user that their attempt to change the state of the controlled device or system has failed, and the controlled device or system is still in its initial state. In some implementations, the renderer 340 may change the message 140 to indicate the failure of the state change instruction, or the failure may be indicated by additional text or graphics.

Figure 8:
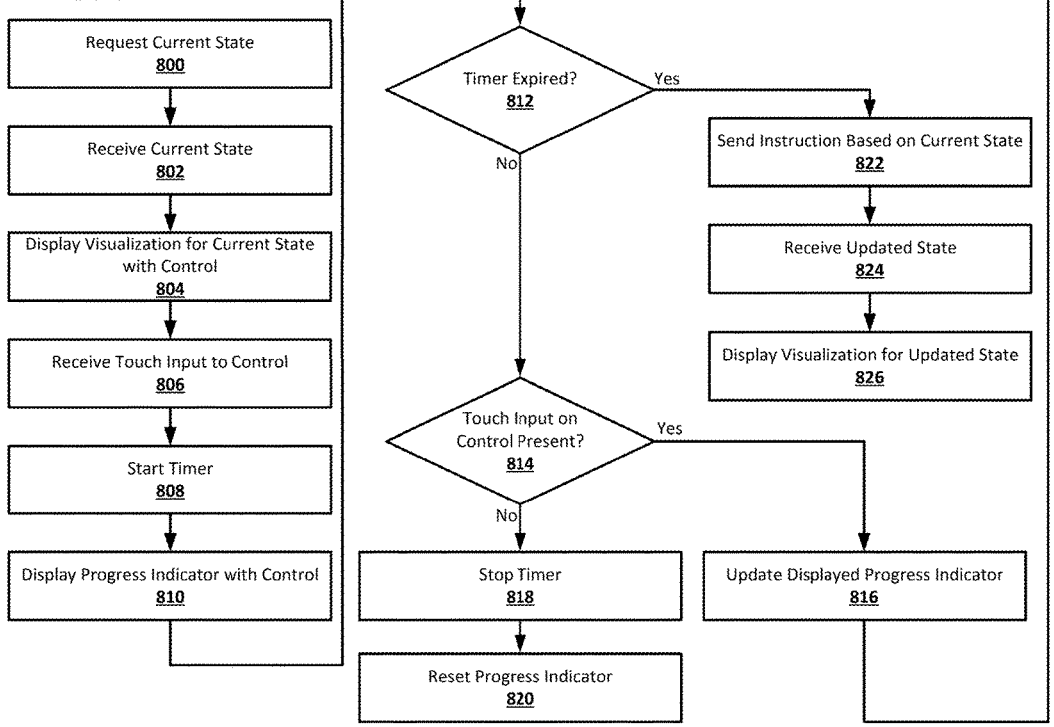
FIG. 8 shows an example of a process suitable for a multi-state press and hold user interface according to an implementation of the disclosed subject matter.

FIG. 8 shows an example of a process suitable for a multi-state press and hold user interface according to an implementation of the disclosed subject matter. At 800, a current state may be requested. For example, the controller 320 of the management application 310 on the computing device 300 may send a request to the computing device 400 for the current state of a device or system. The state may be requested for a device or system controlled by a control 101 which a user has requested by displayed on the touchscreen 350. For example, if the user has requested that the control 101 for the automated locks of a smart home environment be displayed on the touchscreen 350, the controller 320 may request the current state of the automated locks from the computing device 400, which may be, for example, a hub computing device of the smart home environment.

At 802, the current state may be received. For example, the computing device 400 may send the current state of the device or system for which a current state was requested to the computing device 300. The controller 320 may receive the current state and store it as the state 330, for example, within the working memory of the management application 310, or in non-volatile storage on the computing device 300.

At 804, a visualization for the current state may be displayed with a control. For example, the renderer 340 may select an appropriate state icon, such as the state icon 130 or 160, for the controlled device or system to be displayed on the touchscreen 350 with the control 101 for the controlled device or system, based on the state 330. For example, the state 330 may indicate that the front door is locked. The renderer 340 may render a state visualization with the control 101 using the state icon 130. The visualization may also include the progress indicator 120 and other text or graphics, such as the message 140.

At 806, touch input to the control may be received. For example, a user may touch the control 101 displayed on the touchscreen 350. The touchscreen 350 may relay an indication of the user's touching of the control 101 to the controller 320.

At 808, a timer may be started. For example, the controller 320 may start a timer upon receiving an indication that there has been touch input from the user to the control 101. The timer may count up or down to an expiration time, which may be based on the threshold amount of time for which the pressing of the control 101 may be held to activate the control 101.

At 810, a progress indicator may be displayed with the control. For example, the progress indicator 120, if not initially rendered and displayed with the control 101, may be rendered and displayed with the control 101. For example, a circular progress bar may be displayed encircling the state icon 130. Other feedback may also be provided to the user indicating the user's touching of the control 101. For example, the size, color, or texture of the control 101, or colors or textures elsewhere on the touchscreen 110, may be changed. Haptic feedback may also be provided.

At 812, whether the timer is expired may be determined. The timer may run continuously after being started in response to touch input to the control 101. The timer may expire after running for a threshold amount of time that may be associated with the control 101. For example, the control 101 may control an automated lock or automated locks of a smart home environment, and may have a threshold amount of time for 1.5 seconds. The threshold amount of time may be the amount of time for which a press and hold on the control 101 must be maintained by the user in order to activate the control 101. If the timer is expired, flow may proceed to 822. Otherwise, flow may proceed to 814.

At 814, whether the touch input is present on the control may be determined. For example, the controller 320 may determine if it is still receiving an indication from the touchscreen 350 that the user is touching the control 101. If touch input on the control 101 is still present, for example, the user is holding their pressing of the control 101, flow may proceed to 816. If touch input on the control 101 is not present, for example, the user has stopped touching the control 101, flow may proceed to 818.

At 816, the progress indicator may be updated. For example, the renderer 340 may update the progress indicator 120 to visually represent the status of the timer. The progress indicator 120 may visually represent the amount of time passed since the controller 320 started the timer, the amount of time remaining before the timer expires and the control 101 is activated, or both. The renderer 340 may update the progress indicator 120 in any suitable manner, and may base the updating on the state 330 of the device or system controlled by the control 101. For example, the progress indicator 120 may be a circular progress bar which may be filled in a clockwise or counter-clockwise manner, depending on the state 330. If the state 330 indicates, for example, that the front door is locked, the progress indicator 120 may be filled in a clockwise, manner, and if the state 330 indicates that the front door is unlocked, the progress indicator 120 may be filled in a counter-clockwise manner. This may allow a user to visually distinguish between states of the controlled device or system, and determine which instruction will be sent on activation of the control 101, by observing the properties of the progress indicator 120. Flow may proceed back to 812, where the timer may be checked again to determine if it has expired, and, if it has not, flow may again proceed to 814, where it may be determined if the touch input is still being maintained on the control 101.

At 818, the timer may be stopped. For example, the user may have released their pressing of the control 101 before the timer expired. The controller 320 may receive an indication from the touchscreen 350 that touch input on the control 101 is no longer detected. The controller 320 may stop the timer, and the control 101 may not be activated. The timer may be reset, so that it may begin counting again at a later time in response to future touch input on the control 101.

At 820, the progress indicator may be reset. For example, in conjunction with the timer being stopped by the controller 320, the progress indicator 120 may be reset. The renderer 340 may, for example, render the progress indicator 120 as an empty progress bar, removing any fill that had been added to the progress indicator 120 while the timer was running In some implementations, the progress indicator 120 may also be removed from the touchscreen display 350, so that is no longer displayed to the user. Any changes made to the control 101 as feedback to the user on the user's initial touch may be undone, and any haptic feedback may be ceased.

At 822, an instruction may be sent based on the current state. For example, the timer may have expired due to the user pressing and holding the control 101 for the threshold amount of time needed to activate the control 101. The expiration of the timer may activate the control 101. The controller 320 may, upon expiration of the timer, send an instruction to the computing device 400 to be implemented on the device or system controlled by the control 101. The instruction may be based on the state 330 of the controlled device or system. For example, if the state 330 of automated locks, as received before the control 101 was displayed to the user, indicates that the automated locks are locked, the controller 320 may send an unlock instruction to the automated locks. After the instruction is sent, the renderer 340 may render an additional visual indicator, for example, in place of the progress indicator 120. The additional visual indicator may indicate the instruction has been sent, and the controller 320 is waiting for confirmation from the computing device 400 that the instruction was implemented successfully.

At 824, an updated state may be received. For example, the controller 320 on the computing device 300 may receive an updated state for the controlled device or system from the computing device 400. The updated state may be stored as the state 330, and may indicate whether the instruction sent by the controller 320 was successfully implemented on the controlled device or system. For example, if the update state is different from the previous state, and corresponds to the sent instruction, the instruction may have been successfully implemented. If the updated state is the same as the previous state, or is different but does not correspond to the sent instruction, the instruction may not have been successfully implemented.

At 826, a visualization may be displayed based on the updated state. For example, the renderer 340 may select an appropriate state icon based on the updated state for display with the control 101. For example, if that state of automated locks has changed from locked to unlocked based on the implementation of an unlock instruction sent after activation of the control 101, the renderer 340 may select the state icon 160 to be displayed with the control 101. The renderer 340 may change other aspects of the visualization, including, for example, removing the additional visual indicator, and providing textual indication of the change of state, for example, through the message 140. Subsequent activation of the control 101 may result in the instruction sent to the computing device 400 being based on the updated state of the controlled device or system. Any changes made to the control 101 as feedback to the user on the user's initial touch may be undone, and any haptic feedback may be ceased.

Implementations disclosed herein may use one or more sensors. In general, a "sensor" may refer to any device that can obtain information about its environment. Sensors may be described in terms of the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an away (e.g., "armed") state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor, a sensor device, or a sensor package. For clarity, sensors are described with respect to the particular functions they perform and/or the particular physical hardware used, when such specification is necessary for understanding of the embodiments disclosed herein.

Figure 9:
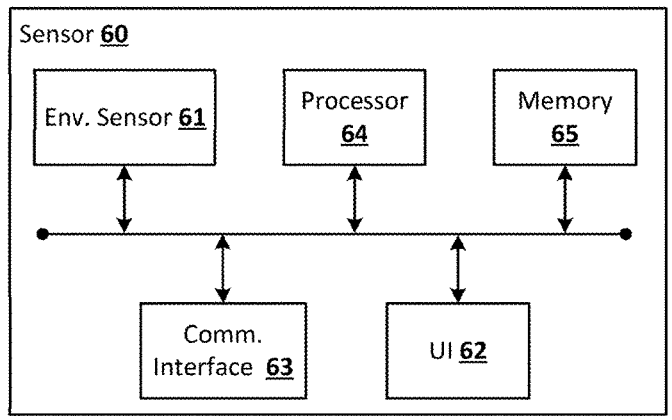
FIG. 9 shows an example sensor as disclosed herein.

A sensor may include hardware in addition to the specific physical sensor that obtains information about the environment. FIG. 9 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a liquid crystal display (LCD), light-emitting diode (LED) display, or limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

As a specific example, a sensor may include a compass and/or an accelerometer as illustrated by FIGS. 1-8 and described in further detail with respect to FIGS. 1-8.

In some configurations, two or more sensors may generate data that can be used by a processor of a system to generate a response and/or infer a state of the environment. For example, an ambient light sensor in a room may determine that the room is dark (e.g., less than 60 lux). A microphone in the room may detect a sound above a set threshold, such as 60 dB. The system processor may determine, based on the data generated by both sensors that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary, for example, during the day the room may already be bright or during the night the lights may already be on. As another example, two or more sensors may communicate with one another. Thus, data generated by multiple sensors simultaneously or nearly simultaneously may be used to determine a state of an environment and, based on the determined state, generate a response.

Data generated by one or more sensors may indicate a behavior pattern of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupants patterns of turning on and off lights, and may generate a response to the learned behavior. For example, at 5:30 PM, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Sensors as disclosed herein may operate within a communication network, such as a conventional wireless network, a mesh network (e.g., Thread), and/or a sensor-specific network through which sensors may communicate with one another and/or with dedicated other devices. In some configurations, one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 10:
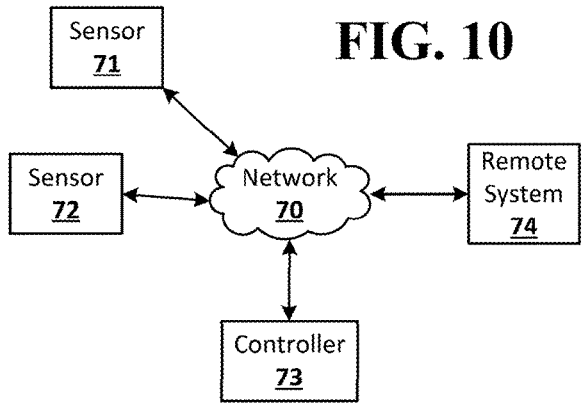
FIG. 10 shows an example of a sensor network as disclosed herein.

FIG. 10 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer such as a smartphone, a smartwatch, a tablet, a laptop, etc. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. In some configurations, the system may have multiple controllers 74 such as where multiple occupants' smartphones and/or smartwatches are authorized to control and/or send/receive data to or from the various sensors 71, 72 deployed in the home. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 10 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 10 may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The controller may determine an intensity level of illumination for lights connected to the smart home system and/or a color or temperature for the lights. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entry point interface devices (e.g., "smart doorbells"). The smart hazard detectors, smart thermostats, and smart doorbells may be the sensors 71, 72 shown in FIG. 10.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 10, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 10, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 10 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 10. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 10. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not be placed in an away mode (e.g., "armed") unless all smart entry detectors (e.g., sensors 71, 72) indicate that all doors, windows, entry points, and the like are closed and/or that all smart entry detectors are in an away mode. In some configurations, the system may arm if it can be determined that the distance the door (or window) is ajar is insubstantial (e.g., the opening is not wide enough for a person to fit through).

The smart-home environment of the sensor network shown in FIG. 10 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 10) can be communicatively coupled to each other via the network 70, and to the controller 73 and/or remote system 74 to provide security, safety, and/or comfort for the smart home environment.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, or the like). A webpage or application can be configured to receive communications from the user and control the one or more of the network-connected smart devices based on the communications and/or to present information about the device's operation to the user. For example, the user can view or change the mode of the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event that any of the network-connected smart devices, such as smart wall plugs located outdoors, detect movement at nighttime, the controller 73 and/or remote system 74 can activate the outdoor lighting system and/or other lights in the smart-home environment.

Figure 11:
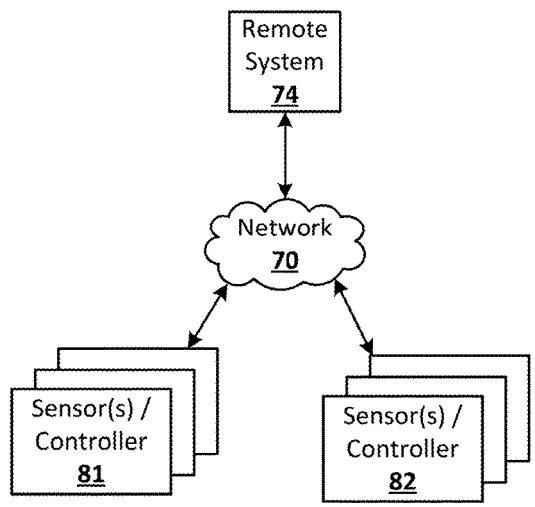
FIG. 11 shows an example configuration of sensors, one or more controllers, and a remote system as disclosed herein.

In some configurations, a remote system 74 may aggregate data from multiple locations, such as multiple buildings, multi-resident buildings, and individual residences within a neighborhood, multiple neighborhoods, and the like. In general, multiple sensor/controller systems 81, 82 as previously described with respect to FIG. 10 may provide information to the remote system 74 as shown in FIG. 11. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. As another example, systems disclosed herein may allow a user to restrict the information collected by the systems disclosed herein to applications specific to the user, such as by disabling or limiting the extent to which such information is aggregated or used in analysis with other information from other users. Thus, the user may have control over how information is collected about the user and used by a system as disclosed herein.

Figure 12:
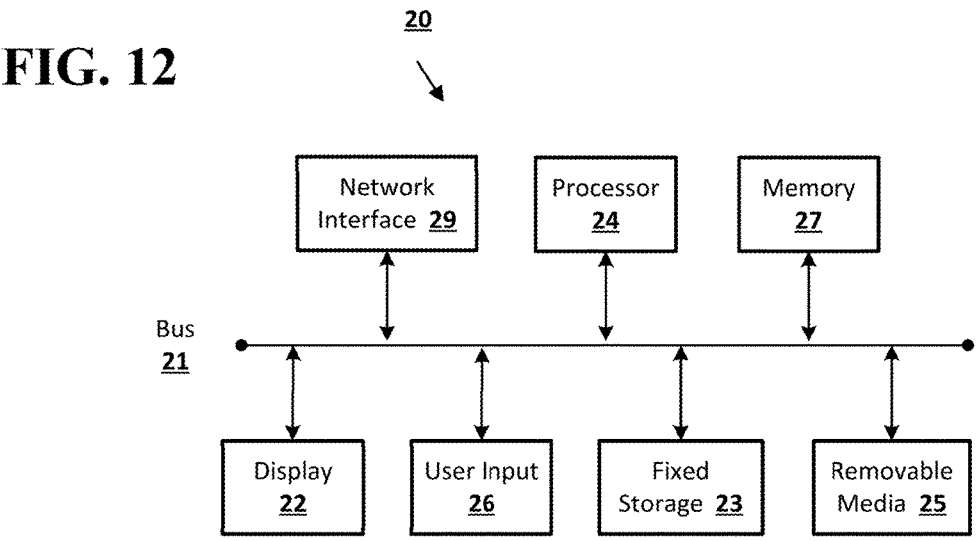
FIG. 12 shows a computer according to an implementation of the disclosed subject matter.

Implementations of the presently disclosed subject matter may be implemented in and used with a variety of component and network architectures. FIG. 12 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 13.

Many other devices or components (not shown) may be connected in a similar manner (e.g., document scanners, digital cameras, and so on). Conversely, all of the components shown in FIG. 12 need not be present to practice the present disclosure. The components can be interconnected in different ways from that shown. The operation of a computer such as that shown in FIG. 12 is readily known in the art and is not discussed in detail in this application. Code to implement the present disclosure can be stored in computer-readable storage media such as one or more of the memory 27, fixed storage 23, removable media 25, or on a remote storage location.

Figure 13:
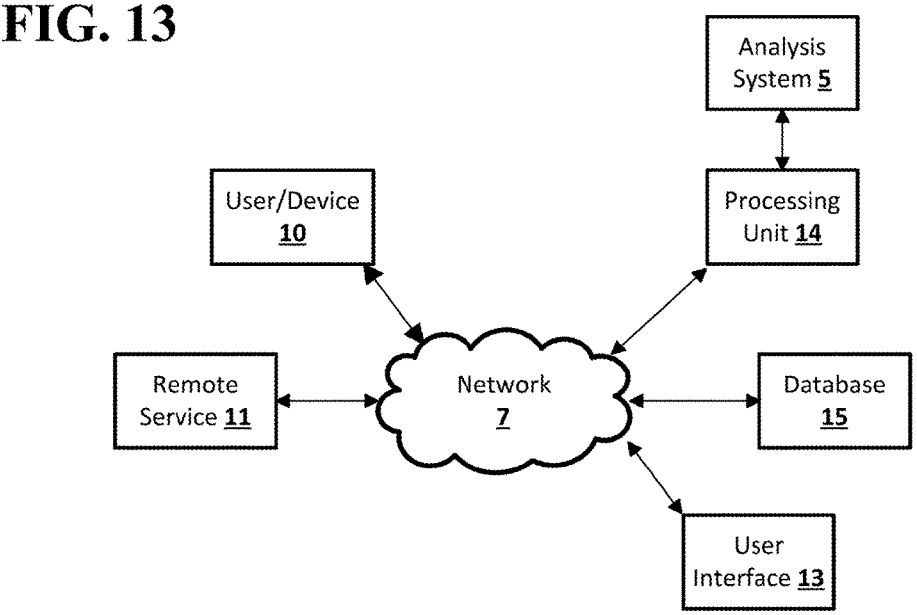
FIG. 13 shows a network configuration according to an implementation of the disclosed subject matter.

FIG. 13 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. The disclosed subject matter also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method performed by a data processing apparatus, the method comprising:

displaying a state visualization on a touchscreen, the state visualization comprising a control for a controlled system and an indicator of a state of the controlled system, wherein the indicator is for an initial state of the controlled system;

receiving an indication of an initial touch input to the control;

displaying visual feedback to indicate the receiving of the initial touch input to the control;

determining that touch input to the control has persisted for a threshold amount of time after the initial touch input to the control;

displaying, on the touchscreen, a first progress indicator while determining that touch input to the control has persisted for the threshold amount of time after the initial touch input to the control, wherein the visual depiction of the first progress indicator is based on the initial state of the controlled system;

sending an instruction to change state to the controlled system, the instruction based on the initial state of the controlled system;

receiving an updated state of the controlled system, wherein the updated state is different from the initial state;

changing the indicator of the state visualization to an indicator for the updated state of the controlled system;

receiving an indication of a second initial touch input to the control;

determining that the touch input to the control has persisted for a second threshold amount of time after the second initial touch input to the control;

displaying, on the touchscreen, a second progress indicator while determining that touch input to the control has persisted for the second threshold amount of time after the second initial touch input to the control, wherein the visual depiction of the second progress indicator is based on the updated state of the controlled system, and wherein at least one aspect of the visual depiction of the second progress indicator is different from at least one aspect of the visual depiction of first progress indicator;

sending a second instruction to change state to the controlled system, the instruction based on the updated state of the controlled system, wherein the second instruction is different from the instruction;

receiving a second updated state of the controlled system; and changing the indicator of the state visualization to an indicator for the second updated state of the controlled system.

2. The computer-implemented method of claim 1, wherein the second updated state of the controlled system is the initial state of the controlled system.

3. The computer-implemented method of claim 1, wherein determining that touch input to the control has persisted for a threshold amount of time after the initial touch input to the control further comprises:

starting a timer when the indication of the initial touch input to the control is received; and running the timer for the threshold amount of time while the touch input persists to the control persists, wherein the timer expires after running for the threshold amount of time.

4. The computer-implemented method of claim 3, further comprising activating the control when the timer expires.

5. The computer-implemented method of claim 1, further comprising wherein displaying visual feedback to indicate the receiving of the initial touch input to the control further comprises one or more of changing a size of the state visualization, changing a color of the state visualization, changing a texture of the state visualization, and displaying a halo around the location of the initial touch input, and providing haptic feedback.

6. The computer-implemented method of claim 1, further comprising providing haptic feedback to indicate the receiving of the initial touch input to the control.

7. The computer-implemented method of claim 1, wherein the controlled system comprises a component of a smart home environment.

8. The computer-implemented method of claim 1, wherein the threshold amount of time is greater than one second.

9. The computer-implemented method of claim 1, further comprising displaying an additional visual indicator after sending the instruction to change state to the controlled system and before receiving an updated state of the controlled system, wherein the additional visual indicator is based on the instruction to change state sent to the controlled system.

10. The computer-implemented method of claim 1, further comprising:

receiving an indication of a third initial touch input to the control;

determining that touch input to the control has not persisted for a third threshold amount of time after the third initial touch input to the control; and not activating the control.

11. The computer-implemented method of claim 10, wherein determining that touch input to the control has not persisted for a third threshold amount of time after the third initial touch input to the control further comprises:

starting a timer when the indication of the third initial touch input to the control is received;

running the timer for the amount of time the touch input to the control persists; and resetting the timer when the touch input stops before the timer has run for the third threshold amount of time.

12. The computer-implemented method of claim 1, wherein the indicator of the state of the controlled system comprises an icon visually representing the state of the controlled system.

13. The computer-implemented system of claim 1, wherein the computing device is further adapted to render, for display on the touchscreen, the first progress indicator while determining that touch input to the control has persisted for the threshold amount of time after the initial touch input to the control.

14. The computer-implemented system of claim 13, wherein the visual depiction of the first progress indicator is rendered based on the initial state of the controlled system, and wherein at least one aspect of the first progress indicator displayed when the initial state is a first state is different from the at least one aspect of the progress indicator displayed when the initial state is a second state.

15. A computer-implemented system for a multi-state press and hold user interface comprising:

a touchscreen adapted to display a state visualization, the state visualization comprising a control for a controlled system and an indicator for a state of the controlled system, receive touch input, and generate an indication of the received touch input; and a computing device connected to the touchscreen, the processor adapted to render the state visualization comprising the control and the indicator the state of the controlled system for display on the touchscreen, receive an indication of an initial touch input to the control from the touchscreen, display visual feedback to indicate the receiving of the initial touch input to the control, determine that touch input to the control has persisted for a threshold amount of time after the initial touch input to the control, display, on the touchscreen, a first progress indicator while determining that touch input to the control has persisted for the threshold amount of time after the initial touch input to the control, wherein the visual depiction of the first progress indicator is based on the initial state of the controlled system, send an instruction to change state to the controlled system, the instruction based on the initial state of the controlled system, receive an updated state of the controlled system wherein the updated state is different from the initial state, render an updated state visualization comprising an indicator for the updated state of the controlled system for display on the touchscreen, receive an indication of a second initial touch input to the control, determine that the touch input to the control has persisted for a second threshold amount of time after the second initial touch input to the control, display, on the touchscreen, a second progress indicator while determining that touch input to the control has persisted for the second threshold amount of time after the second initial touch input to the control, wherein the visual depiction of the second progress indicator is based on the updated state of the controlled system, and wherein at least one aspect of the visual depiction of the second progress indicator is different from at least one aspect of the visual depiction of first progress indicator, send a second instruction to change state to the controlled system wherein the second instruction is different from the instruction, the instruction based on the updated state of the controlled system, receive a second updated state of the controlled system, and change the indicator of the state visualization to an indicator for the second updated state of the controlled system.

16. The computer-implemented system of claim 15, wherein the computing device is further adapted to determine that touch input to the control has persisted for a threshold amount of time after the initial touch input to the control by starting a timer when the indication of the initial touch input to the control is received running the timer for the threshold amount of time while the touch input persists to the control persists, wherein the timer expires after running for the threshold amount of time.

17. The computer-implemented system of claim 16, wherein the computing device is further adapted to activate the control when the timer expires.

18. A system comprising: one or more computers and one or more storage devices storing instructions which are operable, when executed by the one or more computers, to cause the one or more computers to perform operations comprising:
  A computer-implemented method performed by a data processing apparatus, the method comprising:
  displaying a state visualization on a touchscreen, the state visualization comprising a control for a controlled system and an indicator of a state of the controlled system, wherein the indicator is for an initial state of the controlled system;
  receiving an indication of an initial touch input to the control;
  displaying visual feedback to indicate the receiving of the initial touch input to the control;
  determining that touch input to the control has persisted for a threshold amount of time after the initial touch input to the control;
  displaying, on the touchscreen, a first progress indicator while determining that touch input to the control has persisted for the threshold amount of time after the initial touch input to the control, wherein the visual depiction of the first progress indicator is based on the initial state of the controlled system;
  sending an instruction to change state to the controlled system, the instruction based on the initial state of the controlled system;
  receiving an updated state of the controlled system, wherein the updated state is different from the initial state;
  changing the indicator of the state visualization to an indicator for the updated state of the controlled system;
  receiving an indication of a second initial touch input to the control;
  determining that the touch input to the control has persisted for a second threshold amount of time after the second initial touch input to the control;
  displaying, on the touchscreen, a second progress indicator while determining that touch input to the control has persisted for the second threshold amount of time after the second initial touch input to the control, wherein the visual depiction of the second progress indicator is based on the updated state of the controlled system, and wherein at least one aspect of the visual depiction of the second progress indicator is different from at least one aspect of the visual depiction of first progress indicator;
  sending a second instruction to change state to the controlled system, the instruction based on the updated state of the controlled system, wherein the second instruction is different from the instruction;
  receiving a second updated state of the controlled system; and
  changing the indicator of the state visualization to an indicator for the second updated state of the controlled system.

* * * * *